United States Patent
Dreher

(10) Patent No.: US 10,746,239 B2
(45) Date of Patent: Aug. 18, 2020

(54) ZIP LINE BRAKE

(71) Applicant: Easton John Dreher, Wis Dells, WI (US)

(72) Inventor: Easton John Dreher, Wisconsin Dells, WI (US)

( * ) Notice: Subject to any disclaimer, the term of this patent is extended or adjusted under 35 U.S.C. 154(b) by 184 days.

(21) Appl. No.: 15/434,827

(22) Filed: Feb. 16, 2017

(65) Prior Publication Data
US 2017/0268588 A1    Sep. 21, 2017

Related U.S. Application Data

(60) Provisional application No. 62/297,862, filed on Feb. 20, 2016.

(51) Int. Cl.
*F16D 63/00* (2006.01)
*A63G 21/22* (2006.01)
*B61H 9/02* (2006.01)

(52) U.S. Cl.
CPC .......... *F16D 63/008* (2013.01); *A63G 21/22* (2013.01); *B61H 9/02* (2013.01)

(58) Field of Classification Search
CPC ....... F16D 63/008; F16D 63/00; A63G 21/22; B61H 9/02
See application file for complete search history.

(56) References Cited

U.S. PATENT DOCUMENTS

| | | | | |
|---|---|---|---|---|
| 4,238,038 A * | 12/1980 | Fikse | ................ | B61H 9/02 104/178 |
| 2006/0027134 A1 * | 2/2006 | Steele | ................ | B61B 7/00 104/113 |
| 2009/0014259 A1 * | 1/2009 | Cylvick | ................ | A63G 21/22 188/42 |
| 2011/0162917 A1 * | 7/2011 | Steele | ................ | A63G 21/22 188/65.2 |
| 2011/0239898 A1 * | 10/2011 | Brown | ................ | A63G 21/20 105/150 |
| 2012/0145498 A1 * | 6/2012 | Liston | ................ | A63G 21/20 188/378 |
| 2013/0220743 A1 * | 8/2013 | Headings | ................ | B61H 9/02 188/65.1 |
| 2013/0239841 A1 * | 9/2013 | Boren | ................ | B61B 7/06 104/112 |
| 2014/0158012 A1 * | 6/2014 | Hackett | ................ | B61H 9/02 104/113 |
| 2014/0326161 A1 * | 11/2014 | Halliday | ................ | A63G 21/20 104/113 |

(Continued)

*Primary Examiner* — Christopher R Harmon
(74) *Attorney, Agent, or Firm* — Stiennon & Stiennon

(57) ABSTRACT

A portable zip line emergency brake system intended to stop or slow down a zip liner (or load) on a cable while giving the control to the device user or operator on the opposite end of the zip line. As an out of control rider comes down the zip line the operator will lock the device onto the cable and roll it out onto the zip line using a combination of sending force by the operator and gravity to meet the rider's pulley. The device is adjustable for different riders' estimated weights. Once the rider's pulley comes in contact with the device far out on the cable it will use a lever camming action between two brake pads on the cable as it reverses direction. As the brake is engaged it will stop or slow the rider. The operator can then pull the rider to the end safely.

6 Claims, 1 Drawing Sheet

(56) References Cited

U.S. PATENT DOCUMENTS

2016/0046305 A1* 2/2016 Cylvick .................. B61L 23/14
                                                              701/19
2017/0144678 A1* 5/2017 Cylvick .................. B61B 12/02
2018/0214782 A1* 8/2018 Hackett .................. A63G 21/22

* cited by examiner

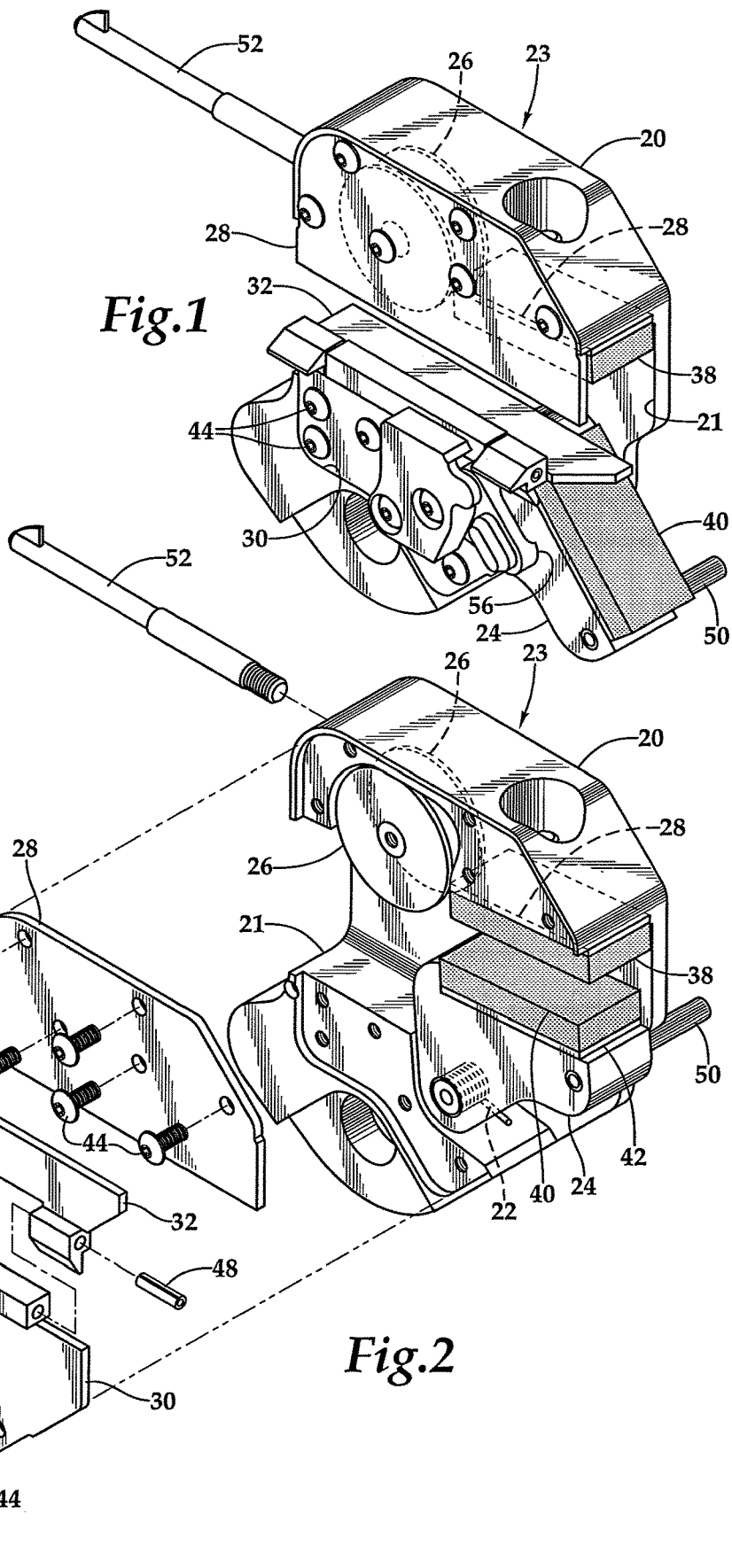

ZIP LINE BRAKE

CROSS REFERENCES TO RELATED APPLICATIONS

This application claims priority on Provisional application No. 62/297,862, filed Feb. 10, 2016, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

Exemplary embodiments relate to a device that will control the braking of the zip line rider by the operator or guide.

A Zip Line operator needs a way to slow down, stop or control a rider from coming into the landing zone too fast or out of control. What is needed is a device that will allow the guide/operator to control the rider's speed and safety.

Presently there is no solution for a portable device or method that will allow the guide/operator to control the rider.

SUMMARY OF THE INVENTION

The present invention provides a portable solution to these problems by providing a device that will allow the operator to control the rider before the end of the zip line if needed.

The brake works in two ways: either by allowing it to roll to the rider, or by attachment to the zip line. As the rider comes down the zip line with rider's pulley on the line, the rider's pulley will come in contact with the brake attached to the zip line cable, and the brake will slow the rider down to a safe speed.

The brake has a pulley(s) inside a carriage or frame. Attached to the carriage are three parts: a fixed pad, a hinged lever, and a spring load or weighted hinged lever that will pinch the cable between the fixed pad and a rotating pad as the cable slides through the carriage/frame.

Preferably the device has pads that use a camming action to grab the cable after it has been run into by the rider with the rider's pulley. These pads will decrease the space between them as the pads come together to stop or slow the rider down to a safe speed.

BRIEF DESCRIPTION OF THE DRAWINGS

FIG. 1. is an isometric view of the zip line brake of the invention

FIG. 2. is an exploded isometric view of the zip line brake of FIG. 1

DESCRIPTION OF THE PREFERRED EMBODIMENTS

A braking device 23 is shown in FIGS. 1 and 2 to slow down, stop or control a rider on a zip line from coming into a zip line landing zone too fast or out of control. The braking device 23 will work in two ways: by allowing the braking device 23 to roll to the rider, or by being attached to the zip line by the zip line operator. As the rider comes down the zip line with the rider's pulley on the line, the pulley will come in contact with the braking device 23 attached to the zip line cable, and the braking device will slow the rider down to a safe speed.

The braking device 23 has a pulley(s) 26 inside a carriage or frame 20 forming a passageway 21. Attached to the carriage 20 there will be three parts. The first is a fixed upper pad 38 mounted to the frame 20 in the passageway 21. The second is a hinged lever 24 mounted to the frame 20 in the passageway 21. The third is a spring load 22 or weight connected to the hinged lever 24 so that a cable passing through the passageway is pinched between the fixed pad 38 and a lower brake pad 40 mounted to the lever 24. The lever 24 is rotatably mounted to the frame 20. The lower brake pad 40 rotates with the lever 24, pinching the cable as the cable slides between the upper and lower brake pads 38, 40 passing through the passageway of the carriage/frame 20.

The braking device 23 has braking pads 38, 40 that use a camming action of the lever 24 rotating on the frame 20 to move the lower pad 40 toward the upper pad 38 to grab the cable, after the braking device 23 has been run into by the rider traveling on a pulley along the cable. These pads 38, 40 will decrease the space between them as the pads come together to stop or slow the rider down to a safe speed.

The frame 20 can be formed with a passageway 21 by 3D printing, being milled or welded. The lever 24 is actuated by a spring 22 or weight (not shown) which works with a camming action. The pulley 26 allows for a smooth roll. The upper carriage plate 28 is fastened to the frame 20. The lower carriage plate 30 is fastened to the frame 20. As shown in FIG. 1, the gate 32 allows the cable 34 to enter and exit the frame 20. The upper brake plate 36 is the medium to allow the upper brake pad 38 to attach to the frame 20.

Fasteners (not shown) allow the upper and lower brake pads 38, 40 to adhere to the frame 20. The lower brake plate 42 is the medium to allow the lower brake pad 38 a means to attach to the frame 20 by the hinge lever 24. Fasteners 44 hold the upper and lower carriage plates 28, 30, the lever 24, the pulley 26, the gate 46 and the gate lock 56 to the frame 20.

The gate hinge pins 48 allow the gate 32 to open and close. The lift pin 50 allows for easier opening and closing of the lever 24. The frame 20 has a pulley hook 52 inserted into a portion of the frame forming a tapped hole (not shown). The pulley hook 52 will connect to a rider's pulley to be able to pull the rider to the end point of the zip line.

The pin weight adjuster will set the lever position for the rider's weight and control the rider safely. The gate lock 56 will lock the gate 32 so the cable will not come out of the passageway 21 of the frame 20 unintentionally.

The term brake pad should be understood as any device which converts the kinetic energy of the operator's brake to thermal energy by friction. The brake pads 38, 40 can be made out of any of the following materials: Ceramic, synthetic and non-synthetic compounds, fibers, rubber, plastics, and combination of these.

Having shown and described this embodiment there may be many ways to modify variations of this brake system within the scope of the claimed invention. It is the intention therefore, to limit the invention only as indicated by the scope of the claims.

I claim:

1. A deployable braking device for use by a zipline operator to control a zip line rider, the device comprising:

a frame, the frame having portions forming a passageway extending through the frame so that the frame is mountable to a zip line which passes through the passageway;

a gate connected to the frame by a hinge, wherein the gate is arranged to rotate on the hinge between a first position providing access to the passageway for positioning of the zip line in the passageway, and a second position in which the gate retains the zip line in the passageway;

a pulley wheel rotatably mounted to the frame within the passageway and arranged to roll on the zip line within the passageway;

an upper brake pad spaced in a first direction from the pulley and fixed to the frame within the passageway;

a lower brake pad mounted to a cam lever rotatably mounted to the frame within the passageway so that the lower brake pad is opposed to the upper brake pad;

a biasing member which biases the cam leaver to urge the lower brake pad toward the upper brake pad; and wherein when the zip line in the passageway moves with respect to the frame from the pulley toward the lower brake pad, the cam lever pivots to separate the lower brake pad from the upper brake pad thereby allowing free movement of the frame along the zip line and when the zip line moves over the lower brake pad toward the pulley, the cam lever rotates to cam the lower pad toward the upper brake pad to grab the zip line, thereby braking the movement of the frame along the zip line.

2. The braking device of claim 1 wherein the biasing member is a spring.

3. The braking device of claim 1 wherein the upper brake pad and lower brake pad are formed of rubber or a synthetic material.

4. A deployable braking device for use by a zipline operator to control a zip line rider, the device comprising:

a frame having portions defining a passageway therethrough which receives a zip line, the passageway defining a line direction extending from a passageway inlet to a passageway outlet;

a pulley wheel rotatably mounted to the frame within the passageway and arranged to roll on the zip line within the passageway;

an upper brake pad fixed to the frame within the passageway downstream in the line direction from the pulley wheel;

a cam lever pivotably mounted to the frame to extend into the passageway downstream in the line direction from the pulley wheel; and a lower brake pad mounted to the cam lever to be opposed to the upper brake pad;

a biasing member which biases the cam leaver to urge the lower brake pad toward the upper brake pad, wherein when the zip line moves in the passageway in the line direction with respect to the frame from the pulley toward the lower brake pad, the cam lever pivots to separate the lower brake pad from the upper brake pad thereby allowing movement of the frame along the zip line and when the zip line in the passageway in the line direction away from the lower brake pad toward the pulley, the cam lever rotates to cam the lower pad toward the upper brake pad to grab the zip line, thereby braking the movement of the frame along the zip line.

5. The A deployable braking device of claim 4 further comprising:

a gate; and a hinge connecting the gate to the frame so that it may rotate between a first position providing access to the passageway for admission of the zip line into the passageway, and a second position in which the gate extends to retains the zip line in the passageway.

6. The braking device of claim 4 wherein the upper brake pad and lower brake pad are formed of rubber or a synthetic material.

\* \* \* \* \*